(12) United States Patent
Chien

(10) Patent No.: US 6,945,663 B2
(45) Date of Patent: Sep. 20, 2005

(54) TUBULAR ELECTRO-LUMINESCENT LIGHT INCORPORATED WITH DEVICE(S)

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 10/341,519

(22) Filed: Jan. 14, 2003

(65) Prior Publication Data
US 2004/0022052 A1 Feb. 5, 2004

Related U.S. Application Data

(63) Continuation-in-part of application No. 10/286,871, filed on Nov. 4, 2002, and a continuation-in-part of application No. 10/286,820, filed on Nov. 4, 2002, and a continuation-in-part of application No. 10/170,584, filed on Jun. 14, 2002, now abandoned.

(51) Int. Cl.[7] .............................................. F21V 21/00
(52) U.S. Cl. ............................ 362/84; 362/23; 362/86; 362/88; 362/108
(58) Field of Search ............................ 362/84, 23, 26, 362/86, 88, 108, 25; 40/544; 313/512

(56) References Cited

U.S. PATENT DOCUMENTS

| | | | | |
|---|---|---|---|---|
| 1,746,024 A | * | 2/1930 | Brandt | 313/358 |
| 3,317,722 A | * | 5/1967 | Whitney | 313/512 |
| 5,485,355 A | * | 1/1996 | Voskoboinik et al. | 362/84 |
| 5,711,594 A | * | 1/1998 | Hay | 362/84 |
| 5,951,140 A | * | 9/1999 | Feldman | 362/84 |
| 6,322,228 B1 | * | 11/2001 | Feldman | 362/84 |
| 6,421,031 B1 | * | 7/2002 | Ronzani et al. | 345/8 |
| 2001/0024364 A1 | * | 9/2001 | Hurwitz | 362/84 |

* cited by examiner

Primary Examiner—Stephen Husar
Assistant Examiner—Anabel Ton
(74) Attorney, Agent, or Firm—Bacon & Thomas, PLLC

(57) ABSTRACT

A tubular electro-luminescent light includes an inner member around which an electro-luminescent panel having electrodes is coiled, and at least one additional wire connected between ends of the light for carrying electric signals related to the function of an external device. The external device may be an audio, video, or communications device, or a power supply for a household appliance or the like, and the electric signals carried by the additional wire, or sensors, may be used to trigger the light. For example, the external device may connect an ear-phone set of a cellular telephone, the device being arranged in a loop to be worn around a body part of the user, a handbag, or the like, and the light being triggered by electric signals indicative of an incoming telephone call.

13 Claims, 6 Drawing Sheets

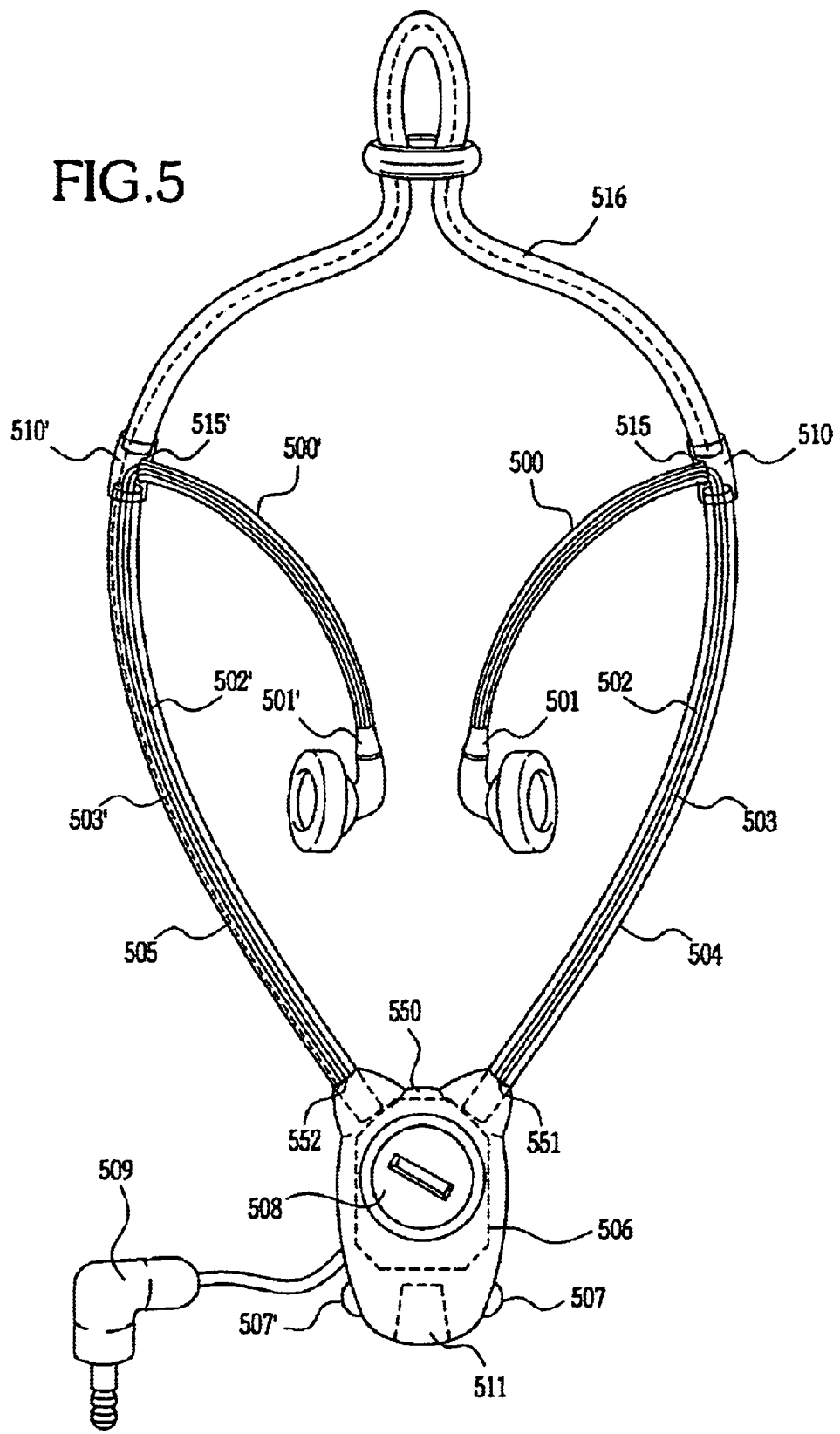

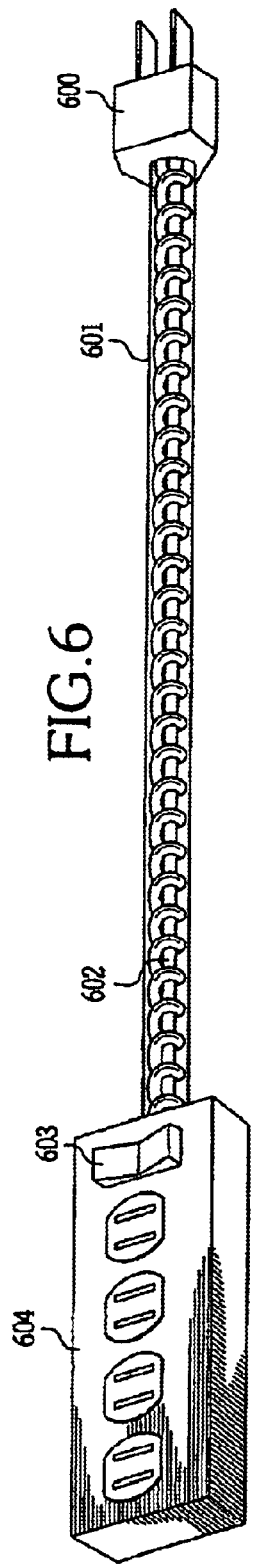
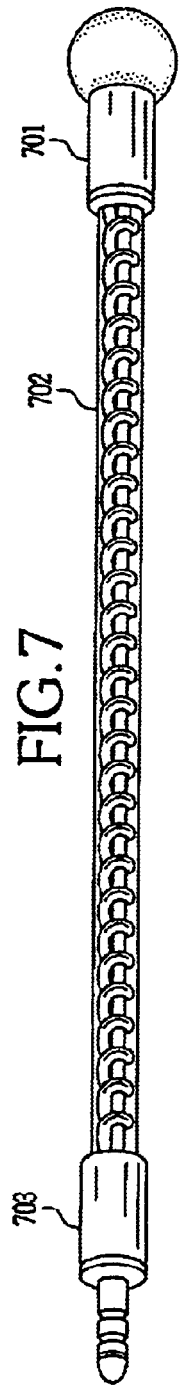
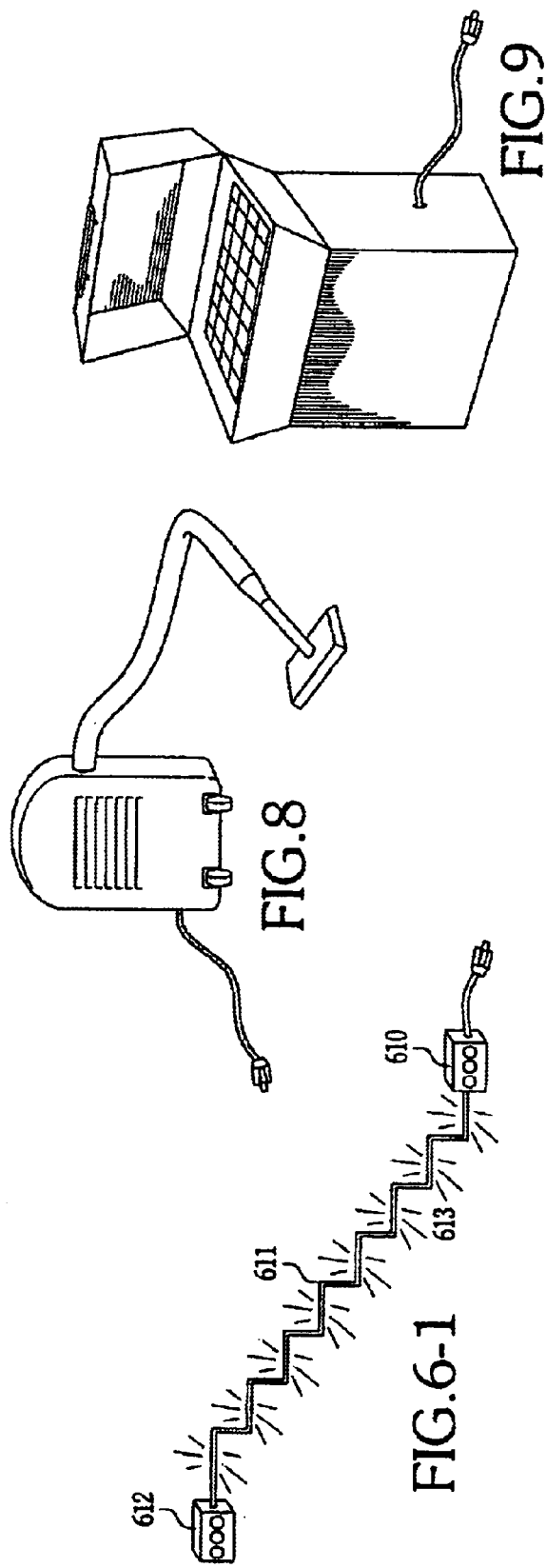

TUBULAR ELECTRO-LUMINESCENT LIGHT INCORPORATED WITH DEVICE(S)

CROSS-REFERENCE TO RELATED APPLICATIONS

This application is a continuation-in-part of U.S. patent application Ser. No. 10/286,871, filed Nov. 4, 2002, U.S. patent application Ser. No. 10/286,820, filed Nov. 4, 2002, and U.S. patent application Ser. No. 10/170,584, filed Jun. 14, 2002, now abandoned.

BACKGROUND OF THE INVENTION

The current invention is a tubular light device with an inner tube member that can protect twisted EL elements from any damage.

More particularly, the present invention involves applications of the tubular light devices disclosed in the co-pending parent patent applications in which panel-type EL elements are twisted and situated within an elongated geometric tube-like protective member, in which conductive members are provided to not only carry electric signals for the lighting element but also to carry electric signals to and/or from device(s) with which the lighting element is associated. The inner tubular members protect the plurality of conductive elements by providing a cushioning effect that protects both the EL elements and conductive members from damage caused by bending, and also allows the tubular lighting element to deliver appropriate electric signals between ends of the element, i.e., to devices other than the lighting element itself. The devices may be selected from the group consisting of video devices, communication devices, radio, MP3, cellular telephones, walkie talkies, extension cords, evacuation lighting, and incoming phone call display devices.

The current invention thus involves a combination of twisted EL panel light elements within a protective means such as tube, and a plurality of conductive elements arranged in a way that allows the inner member of the tubular lighting element not only to provide EL light signal(s) but also to deliver electric signal(s) to and from other devices, for example to deliver cellular phone ear-phone signals from the phone to the ear-piece.

The current invention may further incorporate a trigger means which may selected from the group consisting of sensors that detect signal(s), vibration, motion, light, brightness, humidity, water, heat, shaking, sound, and/or chemicals which can allow the circuit to turn on and turn off based on pre-designed function(s) and duration times so as to allow the light to have special effects based on the features of said device(s).

For example, the current tubular EL light may include motion sensors to provide stairs illumination. The tubular EL light may be installed in stairs areas along the steps so that the lighting elements will turn on when people walk near by the tubular EL light for people to see the each step without falling down.

This is a very good safety feature for normal house application, and is also good for evacuation purposes in case of emergencies in a building, house, or office.

The current invention also can be incorporated into a cellular phone device, walkie talkie, or CD player to enable the existing electric wire to provide more features such as an incoming phone call display. In the example of a cellular phone with incoming phone call display, the tubular EL light kits will be triggered by the incoming phone call electric signal(s) and turn on for illumination of the whole wire, which may be worn around a part of the human body, such as the neck or shoulder, or the wire may be strung around bags or another location. It will help people to know the phone is ringing in a noisy environment or to assist persons who are hear of hearing and so improve the quality of life of such people without any problem. Furthermore, for the ear phone of audio devices such as MP3 or CD players, or radios, the tubular EL light can be arranged on the wires so as to allow the tubular EL light to be triggered by music, resulting in pulses the can make different light shows to provide young people with a good music environment with sound and light functions.

Also, (1) The EL element can have different colors for different light taste.

(2) The EL element(s) may be installed on an inner tube which can deliver the electric signals.

(3) The inner tube can be a non-elastic member for protecting the EL elements.

(4) The inner tube can include electric wires, conductive means, or FPC to deliver signals.

(5) The inner tube can be any size, thickness, diameter, shape, or material, as desired.

(6) The EL element can have different colors to indicate location, length, width for different light effects.

(7) The conductive means of the inner tube can serve as a bus means to allow signal delivery to multiple elements for a desired length.

(8) The incorporated bus means can include means to connect multiple elements to the bus means.

(9) The EL elements can overcome the EL panel's limitation for Minimum Bending Radius by using a super thin substrate of PET material and a laminated layer to reduce peel off strength.

(10) The EL elements have a rivet terminal, which is considered to be incorporated with the tubular EL so that it can easily be passed though the outside tube means to allow easy installation during assembly of products.

(11) The EL elements have inner conductive means which offer less resistance to deliver electricity having a certain voltage and frequency so as to provide even brightness and color along the extremely long length of the tubular light means.

(12) The EL elements have BOLT silver paste, or conductive means, at the most easily damaged areas so as to allow the EL panel(s) to be twisted into a very tiny bending radius without damaging the EL material, including the ITO phosphor, isolating, and dielectric layers.

(13) The EL elements may further incorporate waterproofing using a most simple method at lower cost by isolating the common electrode from other EL electrodes connected with signal ends to enable some light performance.

(14) The EL elements have at least one inner tube by at least one conductive wire/device to hook the EL material, electrode material, conductive means, phosphor, and silver paste.

(15) The EL elements may apply etching techniques to remove all EL material and only have conductive means such as a silver paste coating so as to prevent short circuits caused by water, humidity, etc.

(16) The EL elements can be connected with signal ends over a large distance even when using the standard terminal stamping procedure.

Tubular shape Electroluminescent (EL) light devices are disclosed in U.S. Pat. No. 5,485,355 Voskoboinik et al., U.S. Pat. No. 5,753,381 Feldman et al., and U.S. Pat. No. 5,711,594 Hay, but the tubular devices disclosed in these references have a number of limitations, including the disadvantages that they are too expensive and too slow to produce, too limited in brightness, too difficult to apply etc.

U.S. Pat. No. 5,711,594 Hay discloses a Tubular EL Lamp which includes strips within a glass tube and a glass fiber between the light emitting surface and the tube to gather light from the strip. Also, the tube is an optical element. Such an optical tube is not flexible, does not permit viewing of the light from 0–360 degree, is not available for bending into any shape, does not protect the EL strips, cannot generate linear light over a soft and curved surface, does not provide a colorful light arrangement, is not subject to bending and fixing of the shape, is not stitchable and cannot be glued on a main object surface, and cannot have unlimited length or by joined with other strips for a desired length with the same function.

U.S. Pat. No. 5,893,629 Gubernick discloses a phosphorescent tube with which offers light beams in a dark environment.

U.S. Pat. No. 6,190,027 Lekson teaches a running board with illumination which includes an electroluminescent element within a transparent tube and one optical element position in front in the light emitting direction. This arrangement is essentially the same as that disclosed in the Hay patent. Lekson uses a small EL panel to get the light out to the viewer, who must have to have one optical member to focus the light and provide strength. Lekson does not provide for 0–360 light emission, a method to make a desired length, flexible and bendable features for tube light, a protect member inside and on the back of in a light emitting direction, use of the conductive means of the bus to build unlimited length, a method to overcome the minimum bending radius for EL strips, or stitching or gluing to a main object surface, The current invention use a low-cost panel type of electro-luminescent element sealed within the inside of the tube shape to provide a substantially lower cost, a simple production procedure, super brightness, and the ability to easily make the lighting element have any diameter.

1. The current invention provides a way to make any diameter of tubular EL light device by a simple process.
2. The current invention provides a way to prevent a sharp-angle while bending the plastic tube.
3. The current invention provides a colored plastic tube as a cosmetic purpose for a tubular EL light device.
4. The current invention teach a proper wall thickness for the plastic tube to overcome some bending problems.
5. The current invention provides a way to make an extended Electro-Luminescent panel having an unlimited length.
6. The current invention provides a way to make a multiple colors tubular light device for desired effects.
7. The current invention provides a way to make a tubular EL light device with optical features and properties.
8. The current invention provides a way to have a super brightness tubular EL light device.
9. The current invention provides a way to have a tubular EL light device with any desired bend and fixed shape.
10. The current invention provides a way to have a tubular EL light device with twisted panel(s).
11. The current invention provides a way to have a tubular EL light device that resembles a Neon light by placing panels back to back.
12. The current invention provides a way to have a tubular EL light device for any bending angle by twisted panel(s).
13. The current invention provides a way to have a flat tubular EL light with twisted panel(s) for a weaving effect.
14. The current invention provides a way to have a Magnetic Means incorporated with the tubular EL light device.
15. The current invention enables a tubular light device to be used in joint areas of main objects, such as a tool box or automobile/truck door.
16. The current invention provides a mixed color for twisted EL panels to improve the cosmetic appearance.
17. The current invention provides a variety of applications to different categories of illumination.

The current invention improves upon the above listed US prior art because it is simple to make all kinds of tube shapes with a desired diameter. Also, The brightness can be designed for any brightness requirement without investment in machinery because the marketplace already has available machines that can provide tubes having a lower cost and the ability to quickly make big quantities and provide people with a good lighting device at lower cost and increased safety.

The current invention also offers a Bend-N-Shape features as described in a co-pending US patent application, which offers great performance as a working lamp to provide desired illumination for certain work environments. The current invention also offers a twisted EL panel(s) arrangement for consumer application to items such as a Shoe, Slide, Slipper, Sandal, Automobile, Boat, Bus, Aircraft, Garden, Traffic equipment, Bag, Purse, House, Building, Christmas, Seasonal Item, Bicycle, Tricycle, Toy, Moving Device, Skating or Jogging equipment, Watch, Garment, Clothing, Jeans, Box, Tool Box, Working Lamp, Furniture, Giftware, Headgear, Jewelry, Hair Accessories, Partywear, Sign, Indoor lighting, Outdoor lighting, Street lamp, Guide lamp, Bridge lamp, Traffic cone, New Jersey Deck, Fence, Mail Box, House Number light, Window Sign, Wall Sign, Poster, Passway, Stair, Curb, Line divider for queues, Evacuation light, Fishing Marker, Decoration device for Safety, Decoration, Advertisement, Promotion, Point-Of-Purchase display, Warning light, Accent light, illumination light, Floor light, Delineator guide light, and Evacuation light, which can be found from market place with other light means such as an L.E.D., incandescent light bulb, fluorescent tube, Neon tube etc. The current invention preferably can use an EL light with sufficient light brightness with very low power consumption, as described in the current Inventor's variety of U.S. issued patents including U.S. Pat. Nos. 5,746,501, 5,980,060, 5,722,760, 5,504,397,5,475,574, 5,479,325, 5,570,946, 5,469,342, 5,570,945, 5,704,705, 5,611,621, 5,860,727, 5,865,523,5,879,069, 5,572,817, 5,752,337, 5,794,366, 5,833,508, 5,688,038, 5,871,269, 5,720,651, 5,806,960, 5,947,980, 5,775,016, 5,566,384, 5,876,108,5, 836,671, 5,601,358, 5,754,064, 5,921,653, 5,667,394,6,082, 867, 6,170,958, 6,183,101, 6,171,117, 5,926,440, 6,158,868, 6,182,282, 6,179,431, 5,599,088, 5,213,616, 6,179,431, 6,280,053, 6,170,958, 6,168,282, 5,926,440, 5,683,164, 6,183,101, 6,123,616, 6,280,053, 5,926,440, 5,754,064, 5,879,069 and other issued patents owned by the current inventor. The advantage of electro-luminescent lighting elements in a variety of contexts are explained in several co pending US patent application include U.S. patent application Ser. Nos. 08/305,294; 08/343,404; 08/343,915; 08/383, 404; 08/383,405; 08/409,925; 08/421,647; 08/432,707; 08/438,373; 08/444,064; 08/436,007; 08/444,064; 08/489, 160; 08/498,258; 08/510,701; 08/522,940; 08/561,973; 08/611,049; 08/614,001; 08/522,940; 08/712,484; and 08/734,872, which cover more utilities for Electro-Luminescent elements. The light panels or elements listed above can be attached on any single radius surface without any problem. The current invention uses the "wider tube" space to install narrow EL panel(s), offering the extra space to allow panel(s) to be bent or twisted with any ugly shape that can not be seen by viewer. It also has several arrangements to make the tube look like a Neon tube or a pretty good cosmetic light arrangement. Other features resulting from use of a tube with panel(s) are that they can fit a Sphere-Surface which has more than one radius curvature and can fit pretty well without an ugly shape that would destroy the value of the light. Also, the method uses limited length EL panel(s) that can be connected to provide unlimited length panels as desired.

BRIEF DESCRIPTION OF THE DRAWINGS

FIG. 3-1 is a perspective view of the tubular EL light device illustrated in FIG. 3 with improved jack holder features.

FIG. 5 is a perspective view of an EL tubular light incorporated into the ear phone set of a CD-Player, MP3 player, or other musical device.

FIG. 6 is a perspective view of an EL tubular light incorporated into an extension cord.

FIG. 6-1 is a perspective view of an EL tubular light incorporated into an evacuation guide having an extension cords socket at one end.

FIG. 7 is a perspective view of an EL tubular light incorporated into a Karaoke microphone for singing.

FIG. 8 is a perspective view of an EL tubular light incorporated into a vacuum cleaner.

FIG. 9 is a perspective view of an EL tubular light incorporated into an Bar-B-Q set.

DETAILED DESCRIPTION OF THE PREFERRED EMBODIMENTS

The current invention relates to an Electro-luminescent (EL) light incorporated into various device(s) to let the tubular EL light have more practical functions than a simple light means.

The current invention also teaches how to offer a 0–360 degree viewing angle for light emitted out from the tube at super low cost and yet with a durable quality to prevent damage caused by an outside force or impact to the EL panel. The twisted EL panel has a desired density/space which offers extra room for the EL elements. The "free movement space" is the key to solving the "EL bending limitation". This spacing while twisted can offer a major solution applicable to all EL panel use to provide linear light sources. Also, because the twisted EL panel only has a single surface with light illumination, it will only have the cost of one strip but can get the 0–360 viewing angle with a light beam having excellent light effects available in the conventional market.

The current invention also offers a plurality of the inner conductive wires which can allow the tubular EL light to deliver electric signal(s) other than those required to turn on-off the EL elements, enabling other device(s) to be incorporated with the tubular EL light, the EL light optionally being triggered by electrical signals associated with the device(s) with which it is associated to improve and increase the many benefits to the public of conventional EL panels and the three-dimensional lighting arrangement disclosed in the copending parent applications.

Figure 1:
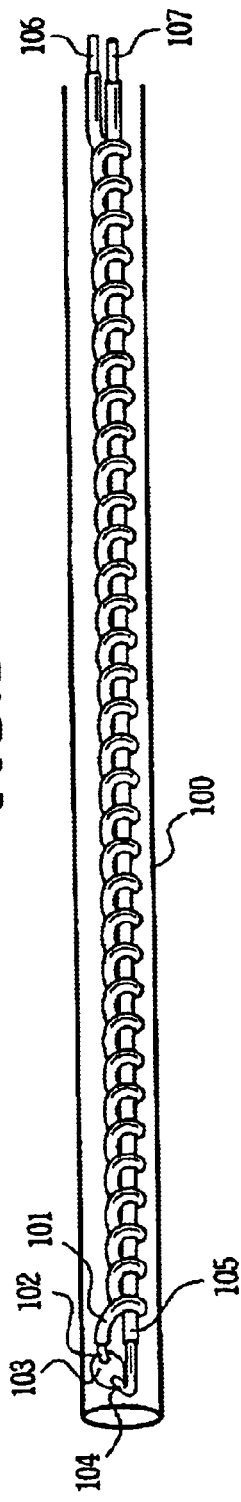
FIG. 1 is a perspective view of the tubular EL light device with EL panel element and inner tube construction, as disclosed in the copending parent applications.

As shown in FIG. 1, the EL panel (101) has a terminal (102) connected with inner tube (105), which is preferably an electric wire having a tip (104). The terminal (102) is soldered to the tip (104) by a conventional soldering procedure. The EL panel (101) is twisted around the inner tube (105) at a proper pitch, with the ends (106) and (107) connected with EL signal(s) to enable the tubular light to have a desired function and brightness. Details of the tubular panels and features of the EL light incorporating same are disclosed in the co-pending parent applications.

Figure 2:
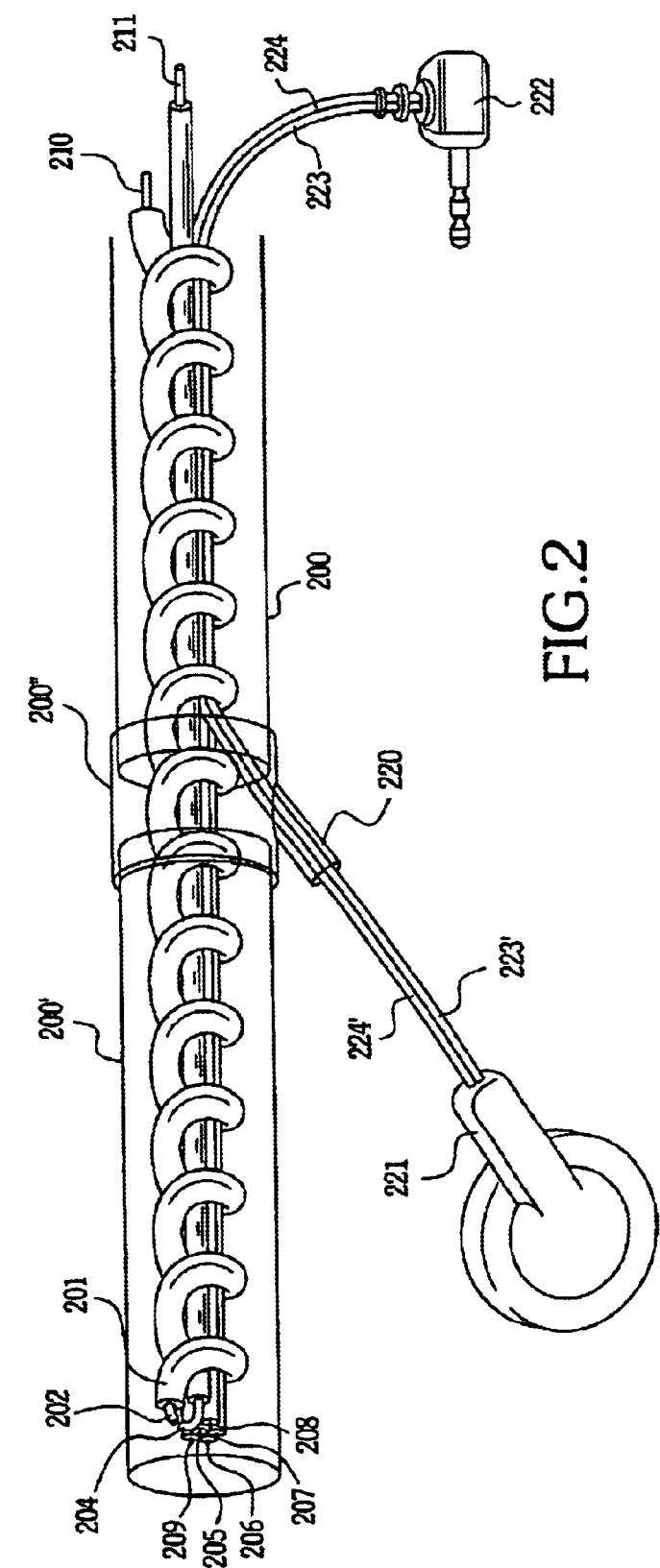
FIG. 2 is a perspective view of a tubular EL light device with special wire(s) arrangement to deliver the desired EL light signal(s) and other device(s) electric signal(s) by a plurality of inner conductive members.

As shown in FIG. 2, the current invention includes multiple inner tubes which preferably carry electric wires (204) (205) (206) (207) (208) (209). One of the inner tubes (204) is connected with the EL panel (201). The tip of wire (204) is soldered with EL terminal (202) so the EL panel can twist around the inner wires along the length to the ends (210) (211) and be connected with EL trigger source ends(+) (−) to cause the tubular EL light to turn on and turn off as provided by an appropriate circuit design. The inner tubes offer a cushion function to protect the EL panel from being damaged by impact or outside forces such as those cause by a hammer, or other forces, as described in the co-pending parent patent applications. The electric signal(s) delivered by the other multiple inner conductive wires (205) (206) (207) (208) may be connected with a device(s)' electric signal output-ends to offer certain electric signal(s) in the form of electrical pulses or waves having a desired current, voltage, or frequency to depending on the function of the device(s) connected to the ends of the multiple inner conductive wires.

In a preferred embodiment, the application end (1) is an electric jack set which can connect with an audio device selected from the group consisting of a radio, FM radio, walkie talkie, MP3 player, cellular phone, CD Player, home stereo device, or other sound equipment. The Application end (1) supplies an electric signal(s) input to the preferred the inner conductive wires (205) (206) (207) to deliver the electric signal(s) to the opposite end(2), which is connected to an ear phone speaker (221). The EL panel (201) may twist around all of the inner conductive means (204 to 209). It also can have different arrangements within the tube (200') However, it is also possible that, within the tube (200), the EL panel (201) only twists around three wires instead of a total of 6 wires. This depends on the production design based on market requirements. Certain ones of the inner conductive wires (223') (224') may separated from the remaining inner conductive wires (205 to 209) and are arranged to extend outside the Y-Shape Tube (200") to provide a special connection arrangement according to market requirements.

Figure 3:
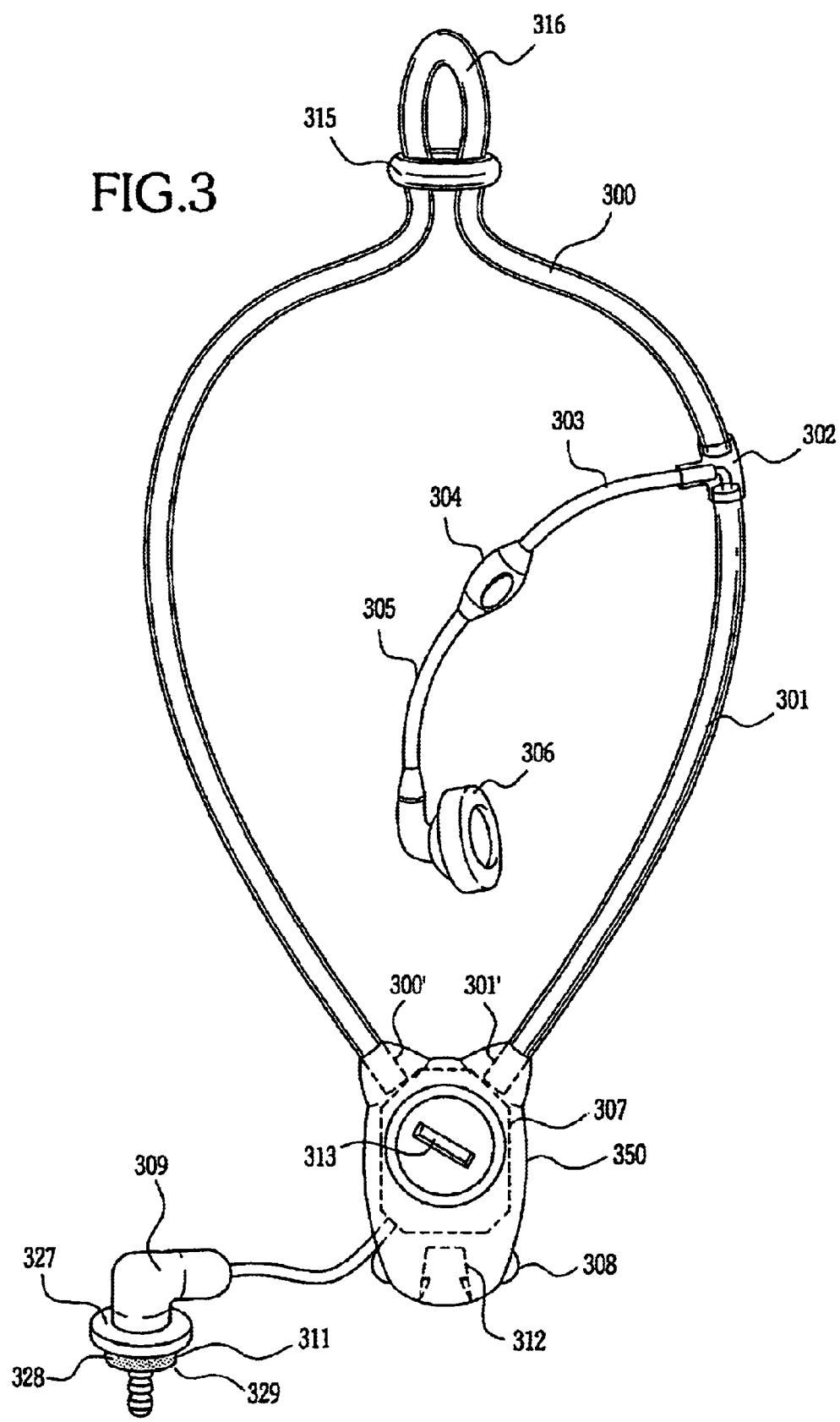
FIG. 3 is a perspective view of a tubular EL light device applied to a cellular phone ear piece device to provide an incoming phone call display.
Figures 1, 3:
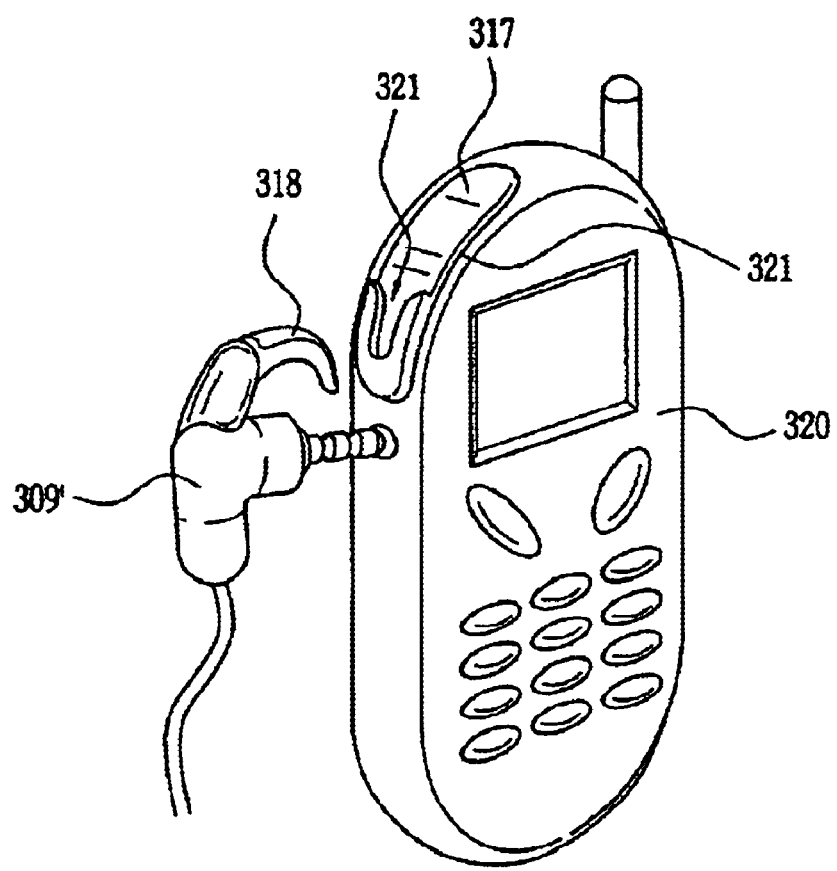

FIG. 3 illustrates a preferred embodiment in the form of an ear-phone set. The ear-phone set includes a housing (350) which has a built-in printed circuit board (307) to provide electric signal(s) for the tubular EL light (not shown), an ear speaker (306), and a phone set (304). The tubular light is powered by a battery (not shown) with a removable battery door (313) having a slot into which a coin can be inserted to enable removal of the door during a battery change. The top of the housing (350) includes two round opening arrangements to allow the tubular EL light and outer tube (301) (300) to be installed and connected with the inner printed circuit board (307) The two outer tubes (300) (301) can be designed as one piece so as to form a continuous tube from opening (300') to opening (301'). It also can alternatively designed with outer tube (300) extending from the opening (300') to the T-connector (302) as one section. The other tube (301) in that case extends from opening (301') to the T-connector (302) to form another section. The two sections are jointed at the T-connector (302) to form a loop to enable people to wear the light on their neck or shoulder with a fastening ring (315) to adjust the length of the whole loop length for different people and wearing purposes. The tubular lights (1) and (2) are well arranged within the tubes (300) and (301) with desired brightness and functions. The preferred function for this cellular phone ear-phone set is "Incoming phone light display". This means when the cellular phone receives an incoming phone call, the tubular light will be turned on and off to let the owner know about the incoming call even in a noisy environment. The jack set (309) is located at the application end (1) to pick up the cellular phone message and pass it to PCB (307) to enable the electric signal(s) corresponding to an incoming phone to be detected and send a tubular light triggering electric signal(s) out to turn on the tubular EL light according to pre-designed functions.

The jack set (309) may preferably be modified to have a bigger ring wall (327) to provide a stopper for double side foam tape (328) installed within the metal plug and the ring wall (327). The thicker foam tape may be pressed and hold the jack steady without any movement. Another alternative design is shown in FIG. 3-1, in which a soft catcher holder (317) is fixed on the phone body at a proper location by glue and the revised jack unit (318) is outfitted with a catch head (318) to make a good catch on the holder's hook (321) to provide additional support for the jack. Of course, the exact design of the jack depends on market requirements.

Figure 4:
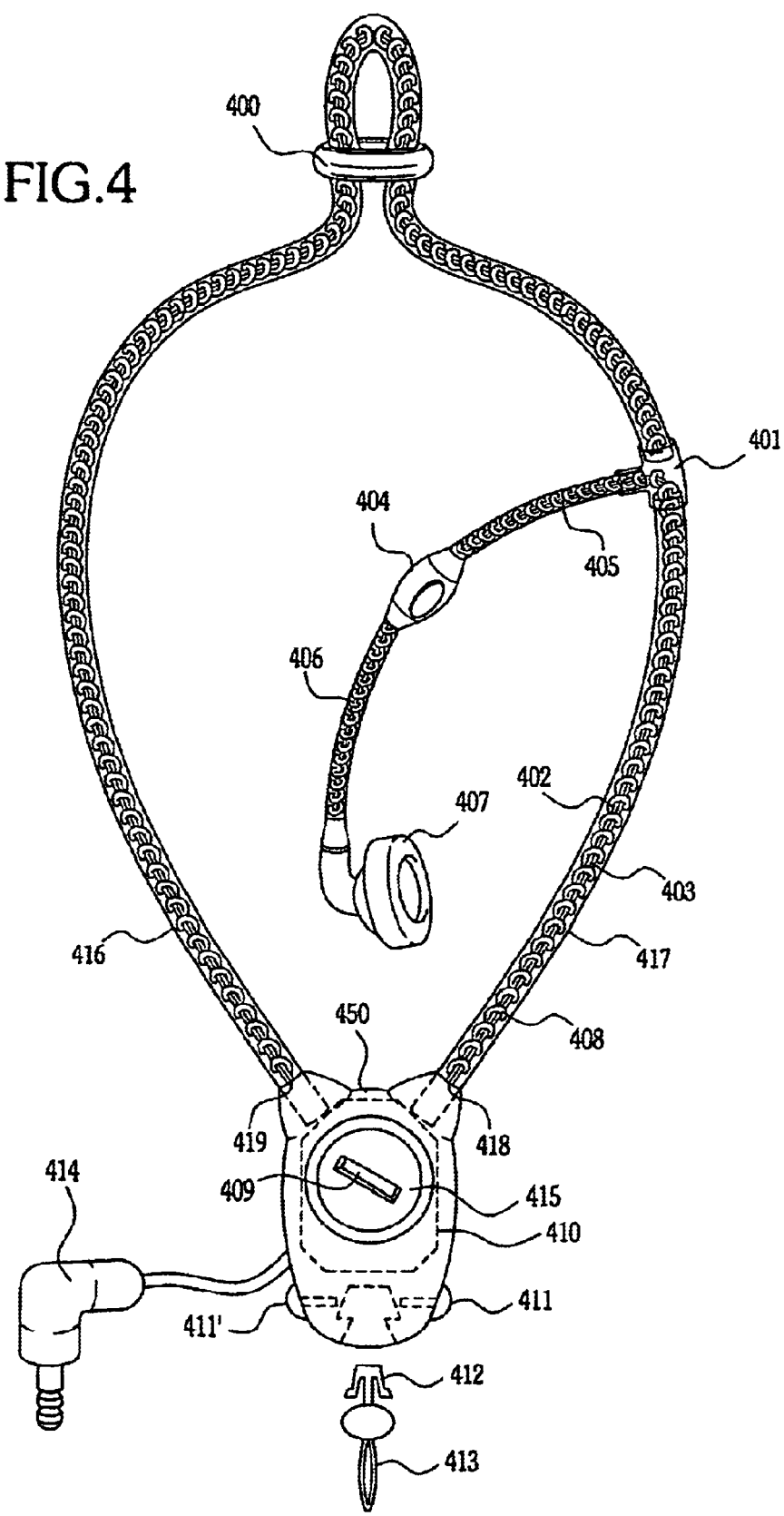
FIG. 4 is a perspective view of an EL Tubular light that is incorporated into a cellular-phone's ear piece set.

As shown in FIG. 4, the ear-phone set includes a housing (450) with an inner printed circuit board (410), phone holder loop(413), phone holder lock (412), first lock release button (411), second lock release button (411'), jack set (414), battery cover(409), and two openings (418) (419) to allow the tube(416) (417) to be securely installed. The fastening ring (400) can offer length adjustment for people wearing. The T-Holder can allow the two separate tubular light sets to be securely connected into a loop. The tube (416) inside preferably includes an inner tube(s) and EL panel twisted within the tube (416) and around the inner tube(s). The tube (417) includes inner tube(s) (403) (402) which preferably are the ear-phone sets' signal conductive wire(s), thereby permitting the tube (417)to have a much small diameter because more inner tubes or a bigger inner tube will cause the outer tube to become much bigger in diameter or dimension (it will be appreciated that the tube(s) can have a variety of geometric shapes). The tubular light also can be applied on the switch and phone set(404) with an inner tube (405). The light also can be included on the ear set (407) with the inner tube (406) at signal end 4. However, the alternative way is to make a loop for people wearing and to extend the tubular EL light along the loop in a manner analogous to that shown in FIG. 2, depending on marketing requirements and design purpose.

Furthermore, as shown in FIG. 5, the tubular light can be applied to a CD player, or music, sound, stereo, MP3, or equivalent device which needs two ear sets. The housing includes two openings (551) (552) to install the two tube members (504) (505) and each one has an inner tube (502) (503) and (502')(503') which can make an electric connection with the speaker set (501) (501'). The tubular light can be arranged within the tube (504)(505) and terminated at the T-connector (510)(510') with only the inner wire (500)(500') coming out from the side hole (515) (515'). The tube means (516) can also have a tubular light arrangement or not depending on market requirements. The preferred tubular light will be much more valuable with the inner tube coming from opening (552) to T-connector (510') and extending to the T-connector end (510), if the tubular light is extended along this inner tube as indicated by the dotted line in FIG. 4.

An alternative arrangement for the tube light including an outside tube and inner electric signal wires for a speaker can be designed and is not limited to the current embodiment.

FIG. 6 shows an extension cord with a tubular light extending along the electric wire(s) with an outer tube (601) and electric wall plug (600), socket sets(604), and switch (603). The electric system for the EL light can be battery operated to avoid the need to file for UL approval.

FIG. 6-1 shows an evacuation guide with a tubular EL light device which may have a phosphor coated on the inner wire in accordance with the inventor's earlier U.S. Pat. No. 5,775,016 and co-pending U.S. patent application Ser. No. 09/054,433. In spite of the EL and PL (Phosphor Luminescent) design, the current invention uses tubular EL elements that are totally different from the EL elements disclosed in the earlier issued patent. The current tubular evacuation light can be operated by batteries with motion sensor(s) on two ends to provide good illumination for indoor and outdoor application with maximum efficiency and low cost lighting, thereby saving the US government a lot of money for aged people injury and all medical expenses. Also, this evacuation guide can be operated by an AC-DC inverter, or an AC-AC adapter for power saving. In the preferred embodiment shown in FIG. 6-1, the AC-DC adaptor provides a DC power source to drive the two sensor(s) (610) (612) at the two ends. The tubular EL light is placed along the stairs at a suitable location so that it can be triggered and turn on after a predetermined time delay and allow aged people to walk on the stair very safely without injury to save the US government expense. This consideration also can work with Power Failure Timing for any building hazard, and powered the tubular EL light by back up batteries systems with power failure detector which connected with wall outlet so can make this with multiple functions with multiple turn on system to make the tubular EL light means have very nice function for market place and make big improvement for public.

FIG. 7 shows an entertainment design for Karaoke singing. The Microphone (701) and jack set (703) are connected by the electric cord (702) which may include a tubular EL light to provide a light function that can be triggered by all kinds of sensor(s) available from the conventional market place with proper electric circuit design.

FIG. 8 shows a preferred embodiment in which an indoor vacuum cleaner is provided with a tubular EL light in an electric cord.

FIG. 9 shows a preferred embodiment in which an electric Bar-B-Q power cord is provided with an EL tubular light arrangement to prevent people from kicking the cord during garden activities.

Having disclosed the invention in detail by way of various examples and preferred embodiments, it will be appreciated that variations and modifications of the preferred embodiment may be made without departing from the scope of the invention. It is accordingly intended that the invention not be limited by the above description or accompanying drawings, but that it be defined solely in accordance with the appended claims.

I claim:

1. A tubular electro-luminescent (E.L.) light incorporated into a main device, comprising:
   at least one inner conductive member;
   at least one electro-luminescent (E.L.) panel including electrodes for causing illumination of said panel, the electro-luminescent panel surrounding the inner member;
   at least one outer member surrounding the inner member and the electro-luminescent (E.L.) panel; and
   at least one additional conductive member arranged to deliver electric signals between ends of said tubular electro-luminescent (E.L.) light and said device, and
   wherein said device is selected from the group consisting of sound equipment, audio equipment, communication equipment, MP3 players, radios, cellular telephones, power cords, evacuation strips, and household appliances.

2. A tubular electro-luminescent (E.L.) light incorporated into a main device as claimed in claim 1, wherein said device is a cellular telephone phone earphone set, said at least one additional conductive wire being arranged to deliver electric signals from a cellular telephone to and from an earphone/microphone set for communication.

3. A tubular electro-luminescent (E.L.) light incorporated into a main device as claimed in claim 2, wherein said electro-luminescent (E.L.) light forms a loop that fits around a body part of the user.

4. A tubular electro-luminescent (E.L.) light incorporated into a main device as claimed in claim 1, wherein the inner member is non-conductive and said electro-luminescent (E.L.) panel is wrapped around the inner member and the at least one additional conductive wire to turn said electro-luminescent (E.L.) panel on and off.

5. A tubular electro-luminescent (E.L.) light incorporated into a main device as claimed in claim 1, further comprising at least one sensor for activating said light in response to an external condition.

6. A tubular electro-luminescent (E.L.) light incorporated into a main device as claimed in claim 1, wherein said device is an evacuation lighting device including two sensors provided respectively at each end of the tubular electro-luminescent (E.L.) light for triggering said light when a person is in a vicinity of said evacuation lighting device.

7. A tubular electro-luminescent (E.L.) light incorporated into a main device as claimed in claim 1, wherein said device is an audio device selected from the group consisting of a radio, MP3 player, CD player, DVD player, VCD player, and other sound device.

8. A tubular electro-luminescent (E.L.) light incorporated into a main device as claimed in claim 1, wherein said device is a cellular telephone and, and wherein said lighting element is triggered in response to an incoming telephone call.

9. A tubular electro-luminescent (E.L.) light incorporated into a main device as claimed in claim 8, wherein said tubular electro-luminescent (E.L.) light is arranged to be installed on a handbag for interior or exterior illumination.

10. A tubular electro-luminescent (E.L.) light incorporated into a main device as claimed in claim 1, wherein said tubular electro-luminescent (E.L.) light connects a cellular phone and an earphone/microphone set, and wherein said electro-luminescent (E.L.) light forms an adjustable loop.

11. A tubular electro-luminescent (E.L.) light incorporated into a main device as claimed in claim 1, wherein said device is a power cord of an electric appliance.

12. A tubular electro-luminescent (E.L.) light incorporated into a main device as claimed in claim 1, wherein said device is microphone of a Karaoke machine arranged to be triggered by audio signals.

13. A tubular electro-luminescent (E.L.) light incorporated into a main device as claimed in claim 1, wherein said device is an extension cord set.

* * * * *